United States Patent [19]
Dutton et al.

[11] Patent Number: 5,819,080
[45] Date of Patent: Oct. 6, 1998

[54] MICROPROCESSOR USING AN INSTRUCTION FIELD TO SPECIFY CONDITION FLAGS FOR USE WITH BRANCH INSTRUCTIONS AND A COMPUTER SYSTEM EMPLOYING THE MICROPROCESSOR

[75] Inventors: Drew J. Dutton; David S. Christie, both of Austin, Tex.

[73] Assignee: Advanced Micro Devices, Inc., Sunnyvale, Calif.

[21] Appl. No.: 582,125

[22] Filed: Jan. 2, 1996

[51] Int. Cl.$^6$ ...................................................... G06F 12/00
[52] U.S. Cl. ........................... 395/586; 395/580; 395/581
[58] Field of Search .................................. 395/586, 581, 395/588, 561, 580

[56] References Cited

U.S. PATENT DOCUMENTS

| | | | |
|---|---|---|---|
| 4,044,338 | 8/1977 | Wolf .......................................... | 365/49 |
| 4,050,094 | 9/1977 | Bourke . | |
| 4,385,352 | 5/1983 | Bienvenu ................................. | 395/418 |
| 4,453,212 | 6/1984 | Gaither et al. ........................... | 395/402 |
| 4,807,115 | 2/1989 | Torng ....................................... | 395/391 |
| 4,835,734 | 5/1989 | Kodaira et al. . | |
| 4,858,105 | 8/1989 | Kuriyama et al. ....................... | 395/582 |
| 4,926,322 | 5/1990 | Stimac et al. . | |
| 4,972,338 | 11/1990 | Crawford et al. ....................... | 395/416 |
| 5,109,334 | 4/1992 | Kamuro ................................... | 395/416 |
| 5,125,087 | 6/1992 | Randell . | |

(List continued on next page.)

FOREIGN PATENT DOCUMENTS

| | | |
|---|---|---|
| A 0 067 667 | 12/1982 | European Pat. Off. . |
| 0259095 | 3/1988 | European Pat. Off. . |
| A 0 369 396 | 5/1990 | European Pat. Off. . |
| 0381471 | 8/1990 | European Pat. Off. . |
| A 0 425 410 | 5/1991 | European Pat. Off. . |
| 0459232 | 12/1991 | European Pat. Off. . |
| A 0 467 152 | 1/1992 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Architecture of the pentium microprocessor by Alpert et al., IEEE publication, Jun. 1993.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," Byte, Jan. 1996, 4 pages.

(List continued on next page.)

*Primary Examiner*—Parshotam S. Lall
*Assistant Examiner*—Zarni Maung
*Attorney, Agent, or Firm*—Conley, Rose & Tayon; B. Noel Kivlin

[57] ABSTRACT

A microprocessor is provided including a branch prediction unit configured to select one of multiple sets of condition flags for use by a branch instruction according to the segment register override prefix byte which may be included with the instruction. Branch instructions may be scheduled distant from the instruction which sets the condition flags tested by the branch instruction. Numerous instructions may be placed between the two instructions, such that the condition flags may be available at the time the instruction is fetched. The branch instruction may be executed without stalling until the condition flags are available. In another embodiment, the branch prediction unit is configured to predict the direction a branch instruction may take according to a branch prediction scheme. Additionally, upon detection of a segment override prefix byte, the branch prediction unit uses an alternative branch prediction scheme. The alternative branch prediction scheme may be to predict the branch taken if a particular segment register override prefix byte is detected, and to predict the branch not taken if another particular segment register override prefix byte is detected.

12 Claims, 7 Drawing Sheets

U.S. PATENT DOCUMENTS

| | | | |
|---|---|---|---|
| 5,226,126 | 7/1993 | McFarland et al. | 395/394 |
| 5,226,130 | 7/1993 | Favor et al. | 395/585 |
| 5,226,132 | 7/1993 | Yamamoto et al. | 395/419 |
| 5,274,834 | 12/1993 | Kardach et al. . | |
| 5,293,592 | 3/1994 | Fu et al. | 395/386 |
| 5,321,836 | 6/1994 | Crawford et al. | 395/416 |
| 5,353,421 | 10/1994 | Emma et al. | 395/587 |
| 5,375,213 | 12/1994 | Arai | 395/418 |
| 5,394,529 | 2/1995 | Brown, III et al. | 395/587 |
| 5,438,668 | 8/1995 | Coon et al. | 325/380 |
| 5,442,766 | 8/1995 | Chu et al. | 395/414 |
| 5,471,593 | 11/1995 | Branigin . | |
| 5,471,597 | 11/1995 | Byers et al. | 395/375 |
| 5,553,255 | 9/1996 | Jain et al. | 395/375 |
| 5,560,032 | 9/1996 | Nguyen et al. . | |
| 5,561,784 | 10/1996 | Chen et al. | 395/484 |
| 5,596,735 | 1/1997 | Hervin et al. | 395/586 |
| 5,606,675 | 2/1997 | Sakamura et al. | 395/584 |
| 5,615,402 | 3/1997 | Quattromani et al. | 395/800 |
| 5,680,578 | 10/1997 | Dutton et al. | 395/481 |

OTHER PUBLICATIONS

IEEE Micro, vol. 13, No. 5, Oct. 1, 1993, pp. 24–36, XP000397921, Makoto Awaga et al: "The VP 64–Bit Vector Coprocessor: A New Implementation of High–Performance Numerical Computation".

MICROPROCESSOR USING AN INSTRUCTION FIELD TO SPECIFY CONDITION FLAGS FOR USE WITH BRANCH INSTRUCTIONS AND A COMPUTER SYSTEM EMPLOYING THE MICROPROCESSOR

BACKGROUND OF THE INVENTION

1. Field of the Invention

This invention relates to the field of microprocessors and, more particularly, to mechanisms for expanding microprocessor functionality within an existing microprocessor architecture.

2. Description of the Relevant Art

Microprocessor manufacturers continue to develop new products which execute x86 instructions in order to maintain compatibility with the vast amount of software developed for previous 80×86 generations—the 8086/8, 80286, 80386, and 80486. Maintaining software compatibility has forced many architectural compromises in newer products. In order to retain the functions of earlier products, hardware has often been simply modified or extended in order to increase capability and performance. One area that is often extended to increase capability and performance is the memory addressing model.

Early x86 microprocessors implemented a memory addressing model using segmentation. In segmentation, a memory address is specified by an instruction using two parts: a segment and an offset within the segment. This type of memory address may be referred to as a "virtual" or "logical" address. The segment selector is stored in a segment register and indicates where the segment is located in main memory (if the processor is running in unprotected mode) or points to a segment descriptor stored in a segment descriptor table in main memory. The segment descriptor contains information about the segment, including its base address. The base address is added to the offset to form the physical address. Each x86 instruction which has the ability to access memory has a default segment register from which it draws its segment data. The x86 architecture defines six segment registers: CS, DS, SS, ES, FS, and GS. CS is the default segment register used for code (instruction) storage. DS is the default segment register used for data accesses of instructions which do not manipulate stack values. For stack accesses, SS is the default segment register. ES is the default segment register used for string manipulation instructions. The default segment may be overridden in favor of another segment register for a particular instruction by adding a segment override prefix byte to the instruction. The segment override prefix byte is a field of the instruction. As used herein, the term "instruction field" refers to one or more bytes within the bytes which form an instruction.

Beginning with the 80386, special paging circuitry was added to the segmented address generation hardware to allow the implementation of paged memory systems. Programmers are developing operating systems which use paged memory systems. Paged memory systems offer the ability to load smaller portions of programs into main memory at any given time and provide additional built-in protection checking for programs running simultaneously. Additional information regarding the paging structure and segmentation in the x86 architecture may be found within the publication "Programming the 80386" by Crawford, et al., SYBEX, Inc., San Francisco, 1987. This publication is incorporated herein by reference in its entirety.

Memory segmentation is typically not used when implementing such paged memory systems upon microprocessors which implement 32 bit logical addressing. Memory segmentation cannot be "turned off," but may be effectively disabled through the use of a "flat" memory model made possible with the advent of 32 bit logical addressing. A flat memory model is created by making all segment registers point to the same memory segment (i.e., making all memory segments overlap). This overlapping is accomplished by storing the same segment information in all segment registers. Programmers using the paging mechanism typically implement the flat memory model.

The flat memory model has a major impact on the utility of the segment registers. Holding redundant segment address information makes the two general purpose segment registers added with the 80286 microprocessor, FS and GS, virtually useless. (The other segment registers are implicitly referenced by 80×86 instructions, but they contain redundant information). In addition, operating systems may detect attempts to use these registers for other useful purposes and may generate an exception. Since these registers are used for address generation, loading a segment register with an improper value might enable a program to corrupt the memory space being used by another program, or by the operating system itself. A constructive use for explicit references to segment registers under the flat memory model is desired.

SUMMARY OF THE INVENTION

The problems outlined above are in large part solved by a microprocessor according to the present invention. The present microprocessor includes a branch prediction unit configured to select one of multiple sets of condition flags for use by a branch instruction according to the segment register override prefix byte included with the instruction. Advantageously, branch instruction functionality may be enhanced through the use of segment register override prefix bytes. The segment override prefix bytes may therefore offer a constructive use with branch instructions even if the flat memory model is employed. Branch instructions may be scheduled distant from the instruction which sets the condition flags tested by the branch instruction. Numerous instructions may be placed between the two instructions, such that the condition flags may be available at the time the instruction is fetched. Therefore, the branch instruction may be executed without stalling until the condition flags are available. Performance of the microprocessor may be increased due to the decreased stalling of branch instructions.

In another embodiment, the branch prediction unit is configured to predict the direction a branch instruction may take according to a branch prediction scheme. Additionally, upon detection of a segment override prefix byte, the branch prediction unit uses an alternative branch prediction scheme. The alternative branch prediction scheme may be to predict the branch taken if a particular segment register override prefix byte is detected, and to predict the branch not taken if another particular segment register override prefix byte is detected.

Broadly speaking, the present invention contemplates a microprocessor comprising several units. An address translation unit is included, and is configured to generate a physical address from a logical address and a segment value. Coupled to the address translation unit is a plurality of segment registers. At least one of the plurality of segment registers stores the segment value utilized by the address translation unit. Additionally coupled to the address translation unit is a first control unit, which is configured to detect an instruction field indicative of one of the plurality of segment registers and to convey a signal to the address translation unit indicative of that segment register. A configuration register for storing a value indicative of an address translation mode of the microprocessor is included. Still further, a branch prediction unit for handling branch instructions is included. The branch prediction unit is configured to modify the handling of a branch instruction according to the instruction field.

The present invention further contemplates a computer system. The computer system comprises a main memory coupled to a microprocessor similar to the above contemplated microprocessor.

BRIEF DESCRIPTION OF THE DRAWINGS

Other objects and advantages of the invention will become apparent upon reading the following detailed description and upon reference to the accompanying drawings in which.

Figure 1:
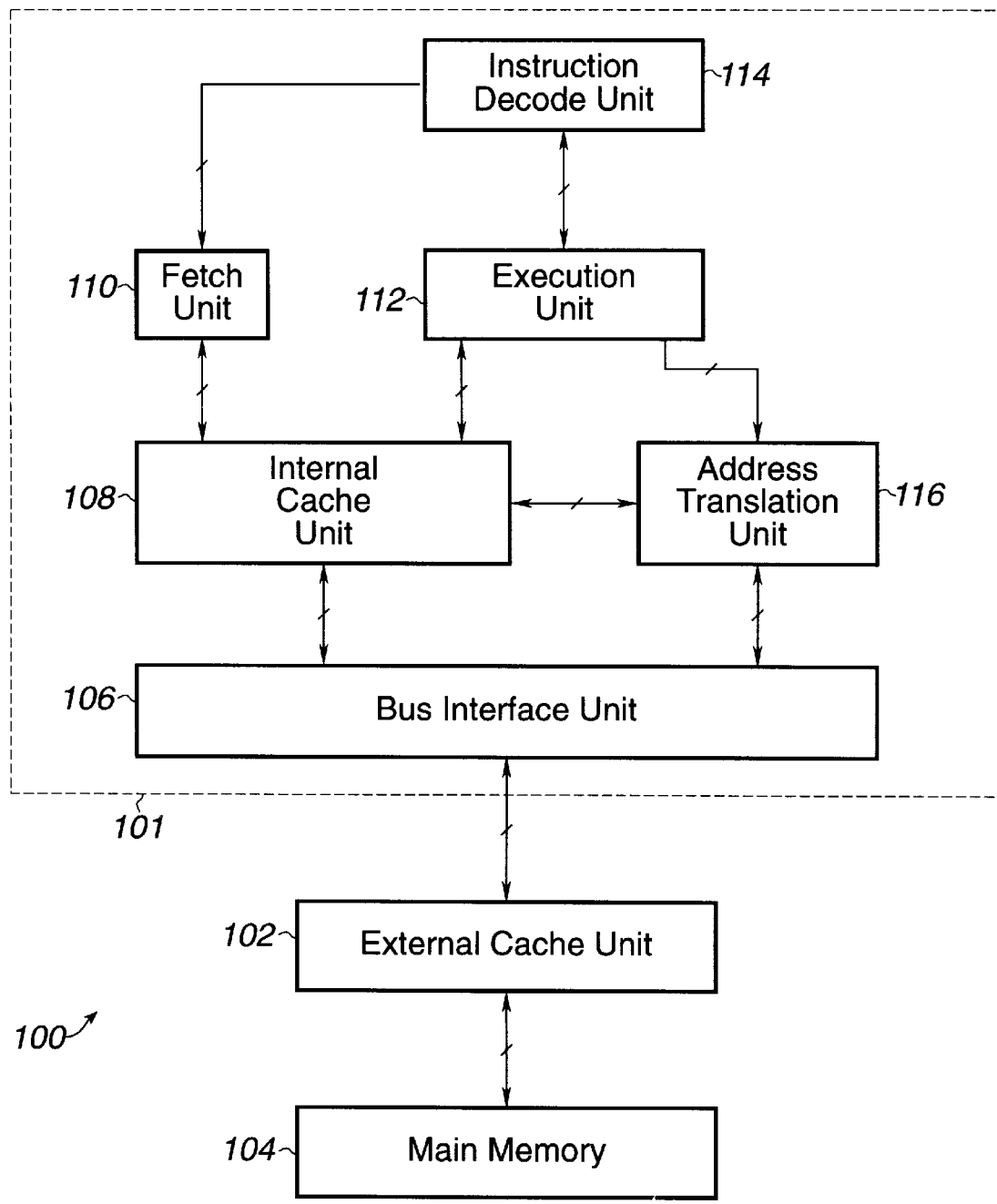
FIG. 1 is a block diagram of a computer system which includes an 80×86 microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a computer system 100 including a microprocessor 101 is shown. In one embodiment, microprocessor 101 implements the 80×86 microprocessor architecture. Microprocessor 101 is coupled to an external cache unit 102 and a main memory 104. In some embodiments, external cache unit 102 is not included. External cache unit 102 is used to speed the transfer of recently accessed data and instructions which are not stored in the internal cache of microprocessor 101. Microprocessor 101 includes a bus interface unit 106 which orchestrates the transfer of information from the internal units of Microprocessor 101 to external cache unit 102 and/or main memory 104. Internal cache unit 108 stores instruction and data information for use by fetch unit 110 and execution unit 112. In one embodiment, internal cache unit 108 includes a unified instruction and data cache. In another embodiment, separate instruction and data caches are configured into internal cache unit 108.

Fetch unit 110 fetches instructions from internal cache unit 108 and passes the instructions to instruction decode unit 114. Instruction decode unit 114 decodes the received instructions for dispatch to execution unit 112. Operands which reside in registers are fetched by instruction decode unit 114 and provided with the instruction when the instruction is dispatched to execution unit 112. Execution unit 112 is configured to execute instructions once the operands are available. As will be appreciated by those skilled in the art, x86 instructions sometimes have operands which are stored in memory at an address specified in a register, by an offset, or by some combination of registers and offsets. In order to retrieve operands stored in memory, execution unit 112 passes segment register identification information and a calculated offset to address translation unit 116. Segment register identification information is generated from either segment override prefix bytes or from the default segment register for the associated instruction. Based on the translation mode of microprocessor 101, address translation unit 116 translates the address via the segmentation method and optionally via the paging method described above.

In one embodiment, the translated address is passed by address translation unit 116 to the internal cache unit. In other embodiments, a cache access is started by execution unit 112 and completed using the translated address from address translation unit 116. In still another embodiment, internal cache unit 108 is addressed with an untranslated address. In this embodiment, address translation unit 116 is accessed when a cache miss occurs, or when cache lines are removed from internal cache unit 108 and returned to main memory 104.

Generally speaking, address translation unit 116 is configured to receive segment register identification information and an offset and to translate this information into a physical address. If flat addressing mode is in effect, the segment register identification information is unimportant since the segment registers each contain the same value. Therefore, features may be added to microprocessor 101 by interpreting the segment identification information passed to address translation unit 116. Features added in this way may be transparent, such that code written to take advantage of the features will run correctly on processors which implement the x86 architecture but do not implement the added features and such that code which was written without awareness of the features will run correctly on processors which implement the added features. Features added in this way may also be non-transparent, such that code written to take advantage of the features may not run correctly on processors which do not implement the features and such that code written without awareness of the features may not run on processors which implement the features. Additionally, features may be added in a non-transparent fashion by using the value stored within the selected segment register (i.e. the segment register specified by the segment register override prefix) to control a feature. When the value stored is used, the feature is non-transparent because address translation unit 114 is configured to ignore (when performing translations) the portion of the segment register used to control the feature. Since this functionality is not a part of the 80×86 architecture, the adding of features controlled by the values stored in a segment register is non-transparent. Many different features are contemplated, as will be revealed below after a discussion of address translation unit 116 in more detail.

Figure 2:
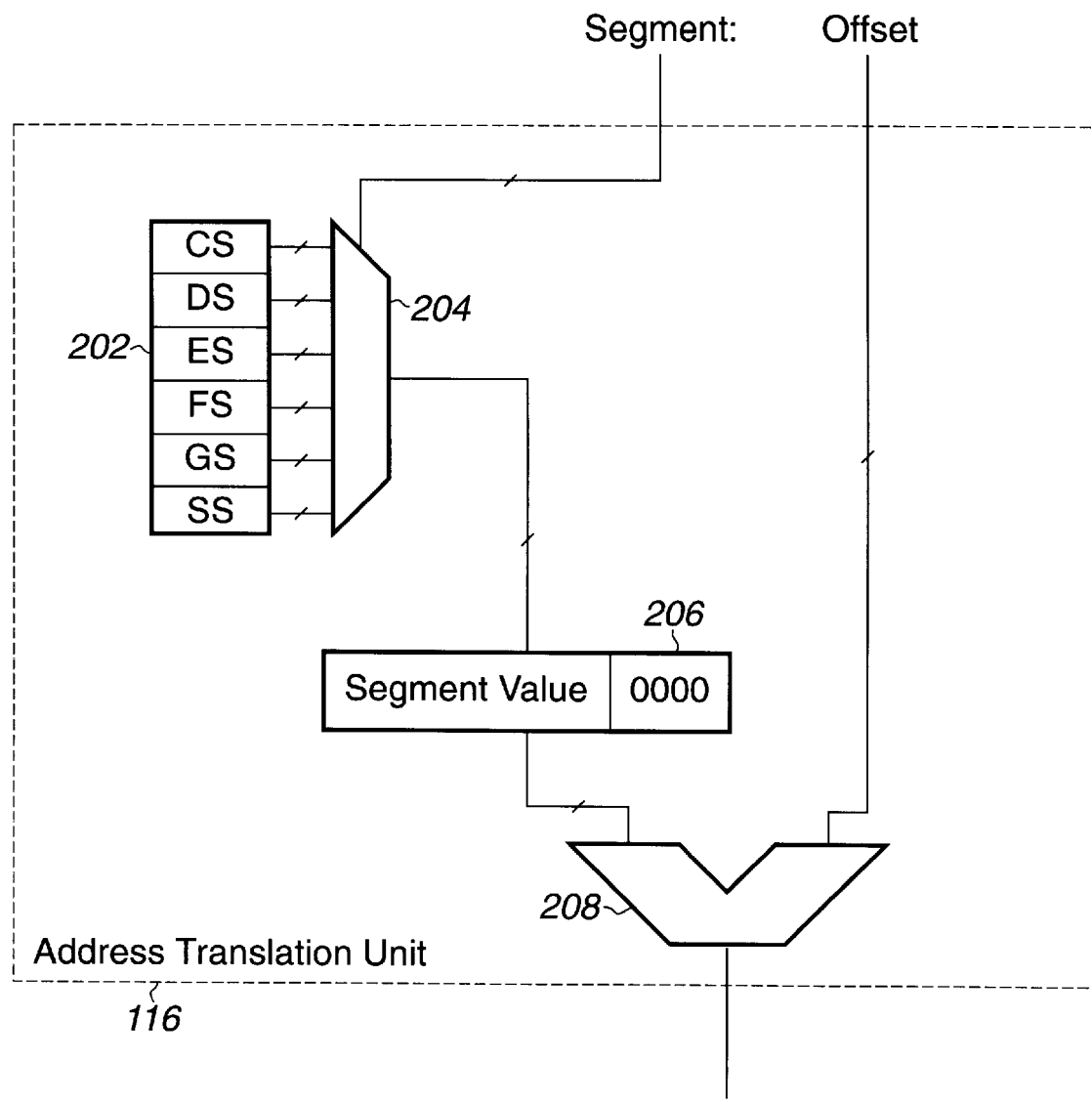
FIG. 2 is a block diagram illustrating the address translation unit of FIG. 1 including structures which generate physical memory addresses in 80×86 microprocessors operating in real mode.

FIG. 2 shows address translation unit 116 of FIG. 1 in more detail for the case of real mode physical address generation. In this mode, address translation unit 116 generates 20-bit physical addresses. Address translation unit 116 is presented with segment register identification information and a 16-bit offset value. Multiplexor 204 uses the segment register selection information to provide the contents of one of the segment registers to the shift register 206. (8086/8 microprocessors have only four of the six segment registers shown: CS, DS, ES, and SS). Shift register 206 then shifts this value four binary bit positions to the left, forming the 20-bit base address of a memory segment. Adder 208 adds the 16-bit offset to the 20-bit segment base address, resulting in a 20-bit physical address for a location in memory.

Figure 3:
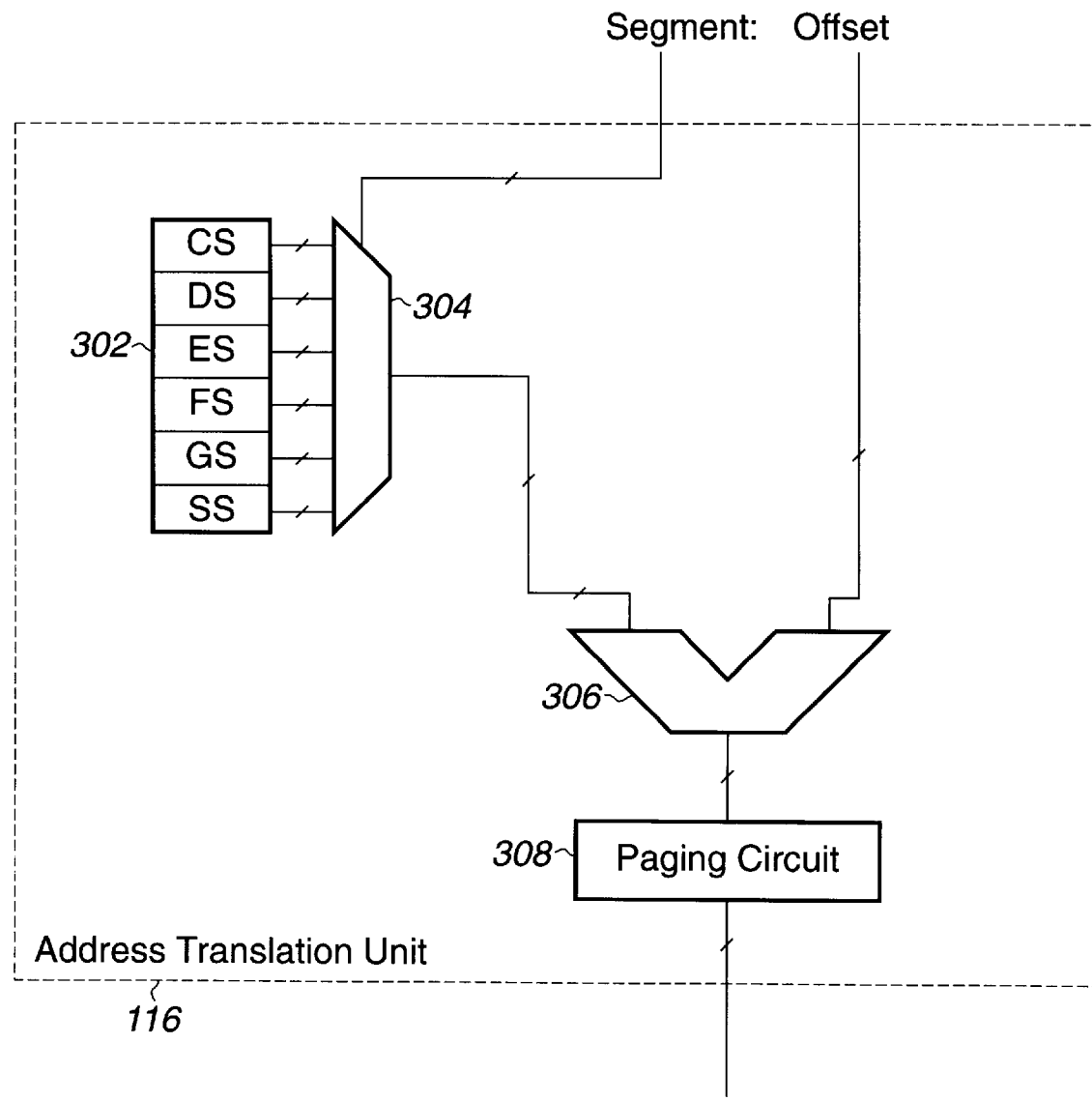
FIG. 3 is a block diagram illustrating the address translation unit of FIG. 1 including structures which generate physical memory addresses in 80×86 microprocessors operating in protected mode.

FIG. 3 shows address translation unit 116 of FIG. 1 in more detail for the case of protected mode physical address generation. Protected mode is not available on 8086/8 microprocessors. As in real mode, address translation unit 116 is presented with segment register identification information and an offset value. In protected mode, however, the segment register contains an index into one of two tables of memory segment information residing in main memory. The tables contain information about the translation of the address, including the base address of the segment and the size of the segment.

Beginning with the 80286 microprocessor, two general purpose segment registers were added (FS and GS), bringing the total number of segment registers to six. Information about six memory segments may be loaded into the six segment registers. Typically shadow registers associated with each segment register store the data from the associated segment descriptor, including the base addresses of the segment. In the 80286, segment base addresses are 24 bits long. In the 80386 and 80486, segment base addresses are 32 bits long. Multiplexor 304 uses the segment register identification information to provide the contents of one of the base addresses of the corresponding memory segment. Adder 306 adds the offset to the segment base address, resulting in a physical address for a location in memory (assuming paging circuitry 308 is disabled). In the 80286, offsets are 16 bits long, and physical addresses are 24 bits long. In the 80386 and 80486, offsets may be 16 or 32 bits long, and physical addresses are 32 bits long. If paging circuitry 308 is enabled, the address formed by adder 306 is translated yet again according to a paging algorithm. The paging algorithm uses high order bits of the address formed by adder 306 to index into a page directory containing addresses of page tables. The address of the page table is added to a second range of bits from adder 306 to find a particular page directory entry. The information stored therein is used to translate the address formed by adder 306 to a physical address.

In flat addressing mode, the paging algorithm is used for the translation and the address generated by adder 306 is the same as the logical address, as noted above. Therefore, the segment registers are of very little use. Of particularly little use are segment registers FS and GS, which are not default segment registers for x86 instructions. Therefore, the segment register override prefix bytes referring to the FS and GS registers may be used to enable expanded features of microprocessor 101. Furthermore, segment register override prefix bytes which specify the default segment register for an instruction may be used in a second embodiment. It is noted that the second embodiment may also be used when flat memory addressing is not in effect.

Figure 4:
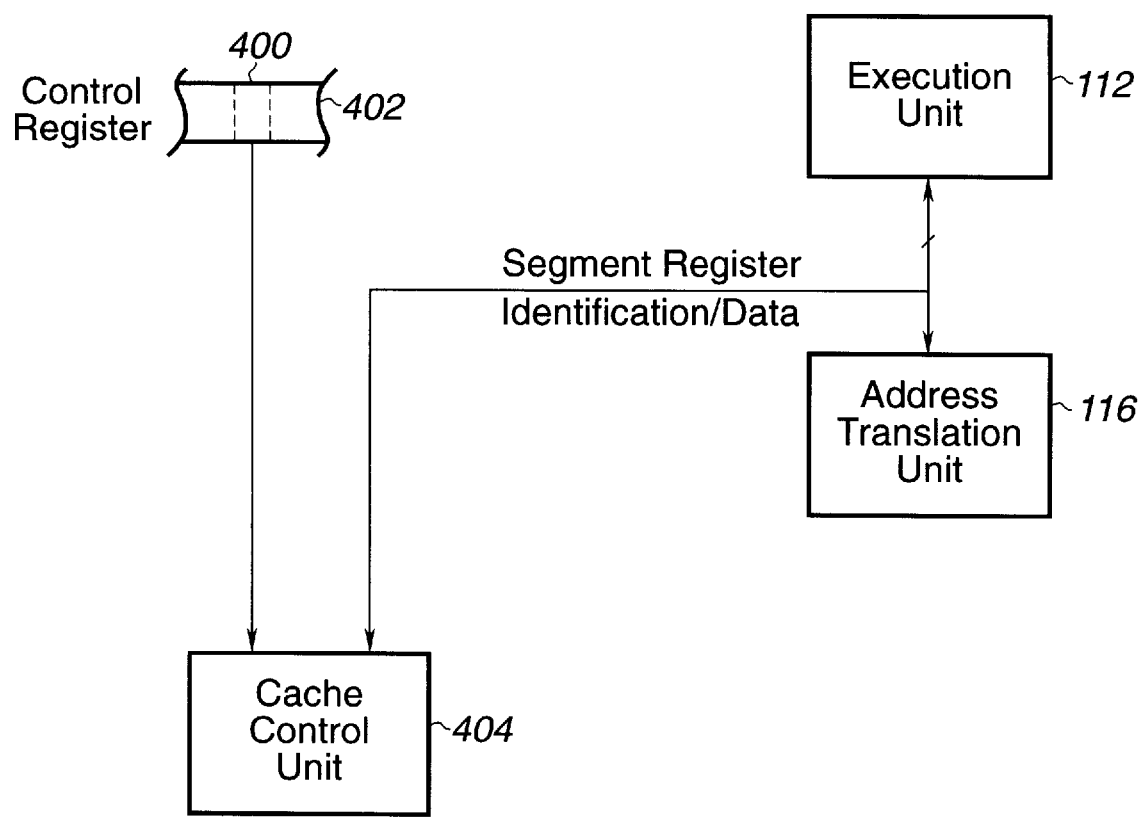
FIG. 4 is a block diagram of a portion of a microprocessor including a cache controller which is selectively enabled through segment register selection information.

FIG. 4 is a block diagram of a portion of microprocessor 101 including a cache control unit 404. Cache control unit 404 is configured within internal cache unit 108 and is coupled to execution unit 112 and to a control register 402. Cache control unit 404 is selectively enabled using segment register identification information, provided by the execution unit 112, and using the contents of an enabling bit 400 in control register 402. When enabling bit 400 is set, the cache controller 404 selectively stores data associated with the instruction which produced the segment register identification information in internal cache unit 108. This cacheability selection is in addition to the architectural cacheability selection of the x86 architecture as embodied in the PCD bit of the page table entry. In one embodiment, the data is stored unless the FS segment register is specified by a segment register override prefix byte for the associated instruction. Other embodiments may use other segment register overrides for this function.

In another embodiment, the value stored within the selected segment register is conveyed to cache control unit 404. The cacheability of a particular address is thereby determined by the value conveyed.

If enabling bit 400 is cleared, the segment register identification information is not used to determine cacheability of a particular address. In another embodiment, the cacheability trait for an address is conveyed to external cache 102 (shown in FIG. 1).

In yet another embodiment, cache controller 404 is configured to selectively store a line in write-through or writeback mode. When enabling bit 400 is set, the cache controller 404 selectively stores data associated with the instruction which produced the segment register identification information in internal cache unit 108 in a write-through or writeback mode. This mode selection is in addition to the architectural write-through selection of the x86 architecture as embodied in the PWT bit of the page table entry. In one embodiment, the data is stored in writeback mode unless the FS segment register is specified by a segment register override prefix byte for the associated instruction. Other embodiments may use other segment register override prefix bytes for this function. In yet another embodiment, the value stored within the selected segment register is conveyed to cache control unit 404. The write-through or writeback mode of a particular address is thereby determined by the value conveyed. If enabling bit 400 is cleared, the segment register identification information is not used to determine the write-through or writeback mode of a particular address. In another embodiment, the write-through or writeback trait for an address is conveyed to external cache 102 (shown in FIG. 1).

Cache control unit 404 has another embodiment which implements a cache flush or cache clean operation dependent on a particular value of segment register identification information associated with an instruction. A cache flush operation causes a cache line containing the address of the cache flush operation to be removed from the cache. If the line is modified with respect to main memory, the modified value is written back to main memory. A cache clean operation is similar to the flush operation in that a modified cache line is written back to main memory. However, the cache clean operation does not remove the line from the cache. These operations affect a single cache line, as opposed to the INVD and WBINVD instructions of the x86 architecture which affect the entire cache at once. The GS segment override prefix byte is used to cause a flush operation in this embodiment, and the ES segment override prefix byte is used to cause a clean operation. Other embodiments may use other segment register override prefix bytes for these functions, or may use the value stored in the selected segment register to specify these functions. If the value stored in the selected segment register is used, then the value is conveyed to cache control unit 404 along with the segment identification value.

In still another embodiment, cache control unit 404 implements a speculative miss line fill function based on the use of the FS segment register override prefix byte. In this embodiment, if the FS segment override prefix byte is specified for a particular instruction and the address associated with that instruction misses internal cache unit 108, then the cache line containing the address is fetched from main memory even if the instruction was executed by execution unit 112 speculatively. Sometimes, a particular instruction may appear to be speculative to microprocessor 101 even though the address is correct and will be needed by the program in the near future. If a programmer or is aware is aware of this situation, it could specify that a cache miss for the instruction be speculatively fetched into internal cache 108. When used in the context of instruction execution, the term "speculative" means that an instruction is executed before that instruction is known to be required by the sequential execution of instructions in a program.

Another embodiment of cache controller 404 is configured to allocate a cache line for a store instruction which misses internal cache 108 if the ES segment register override prefix byte is included in the store instruction. If enabling bit 400 is not set, then store instructions which miss internal cache 108 are written to main memory without fetching the associated cache line into internal cache 108. If enabling bit 400 is set, then store instructions that miss internal cache 108 will cause a cache line fill of the associated data bytes to occur if the store instruction includes the ES segment register override prefix byte. If the ES segment register override prefix byte is not included, then the cache line fill will not occur and the store data will be written to main memory. In still a further embodiment, a store instruction which misses the cache will cause a cache line to be allocated but the associated data bytes will not be fetched from memory. The data bytes provided by the store instruction will be stored into the cache line. However, the other data bytes of the cache line are marked invalid in internal cache 108 until additional store instructions cause the other data bytes to become valid. In an alternative embodiment, the other data bytes are set to zero. An additional embodiment of cache control unit 404 is configured to used the value stored in the selected segment register to specify the above mentioned speculative miss line fill functions.

In one embodiment, control register 402 is control register 0 present in 80386 and later microprocessors. The enabling bit 400 is bit 31 of control register 0, the paging bit. When bit 31 is set, paging is enabled.

Figure 5:
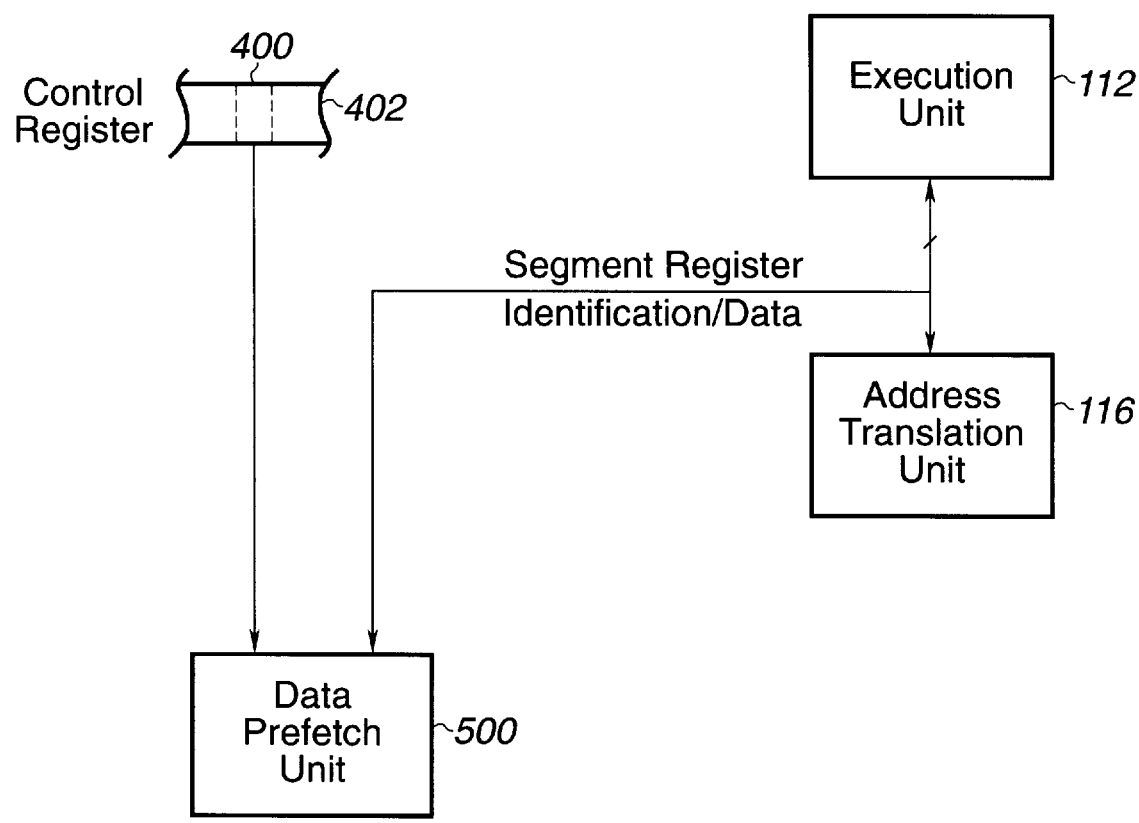
FIG. 5 is a block diagram of a portion of a microprocessor including a data prefetch unit which is selectively enabled through segment register selection information.

FIG. 5 is a block diagram of a portion of microprocessor 101 including a data prefetch unit 500. Data prefetch unit 500 is coupled to execution unit 112 and to control register 402. Data prefetch unit 500 is selectively enabled using segment register identification information, provided by the execution unit 112, and using the contents of enabling bit 400 in control register 402. When enabling bit 400 is set, data prefetch unit 500 prefetches data associated with cache lines stored in consecutive groups of bytes of main memory 104 (shown in FIG. 1) starting at the address indicated by the instruction. The cache lines are stored by internal cache unit 108. If enabling bit 400 is not set, then the data prefetch unit remains idle. In one embodiment, data prefetch unit 500 begins prefetching if the FS segment register override is used for an instruction. The number of consecutive cache lines fetched by data prefetch unit 500 may vary from embodiment to embodiment. In another embodiment, data prefetching begins under the control of the value stored in the selected segment register. Additionally, the number of consecutive cache lines to fetch may be specified by the value stored in the selected segment register.

In yet another embodiment, data prefetch unit 500 implements other prefetching schemes. It is noted that many prefetching schemes are suitable for data prefetch unit 500, including a stride based prefetching scheme and other "smart" prefetching schemes. Various "smart" prefetching schemes are well-known, and typically involve generating prefetch addresses via a predetermined algorithm other than fetching sequential addresses.

Figure 6:
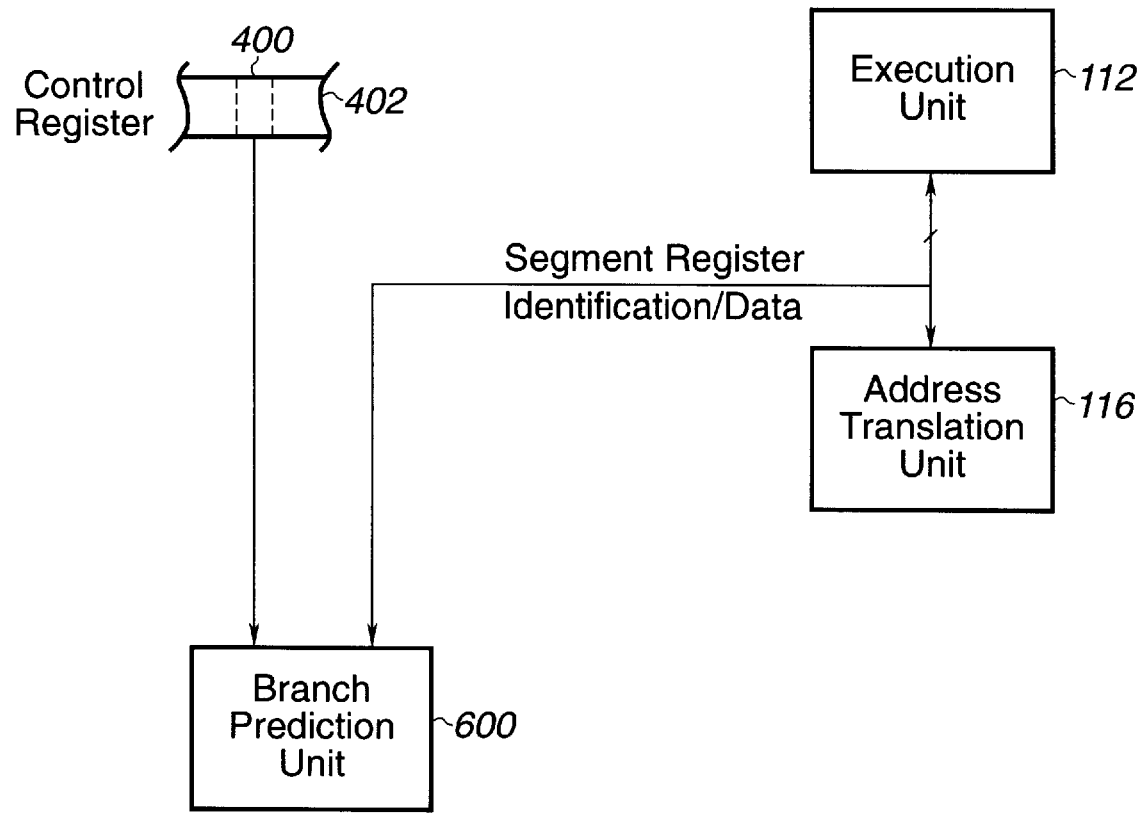
FIG. 6 is a block diagram of a portion of a microprocessor including a branch prediction unit which receives control information through segment register selection information.

FIG. 6 is a block diagram of a portion of microprocessor 101 including a branch prediction unit 600 which is including in fetch unit 110. Branch prediction unit 600 is coupled to execution unit 112 and to a control register 402. Branch prediction unit 600 implements the branch prediction scheme embodied within fetch unit 110, as well as an alternative scheme. The alternative scheme is enabled through segment register identification information, provided by execution unit 112, and the contents of enabling bit 400 in control register 402. If enabling bit 400 is not set, then the branch prediction scheme of branch prediction unit 600 is used. If enabling bit 400 is set, then the branch prediction scheme of branch prediction unit 600 is used except when a branch instruction includes the FS or GS segment register override prefix bytes. In this case, the alternative branch prediction scheme is used. It is noted that "branch prediction" refers to predicting whether a branch instruction causes program execution to continue at a new address specified by the branch instruction or causes program execution to continue at an instruction subsequent to the branch instruction within main memory 104. If the branch instruction causes program execution to continue at the new address (or target address), then the branch is said to be "taken". Alternatively, if the branch instruction causes program execution to continue at the subsequent instruction, the branch is said to be "not taken".

Figure 7:
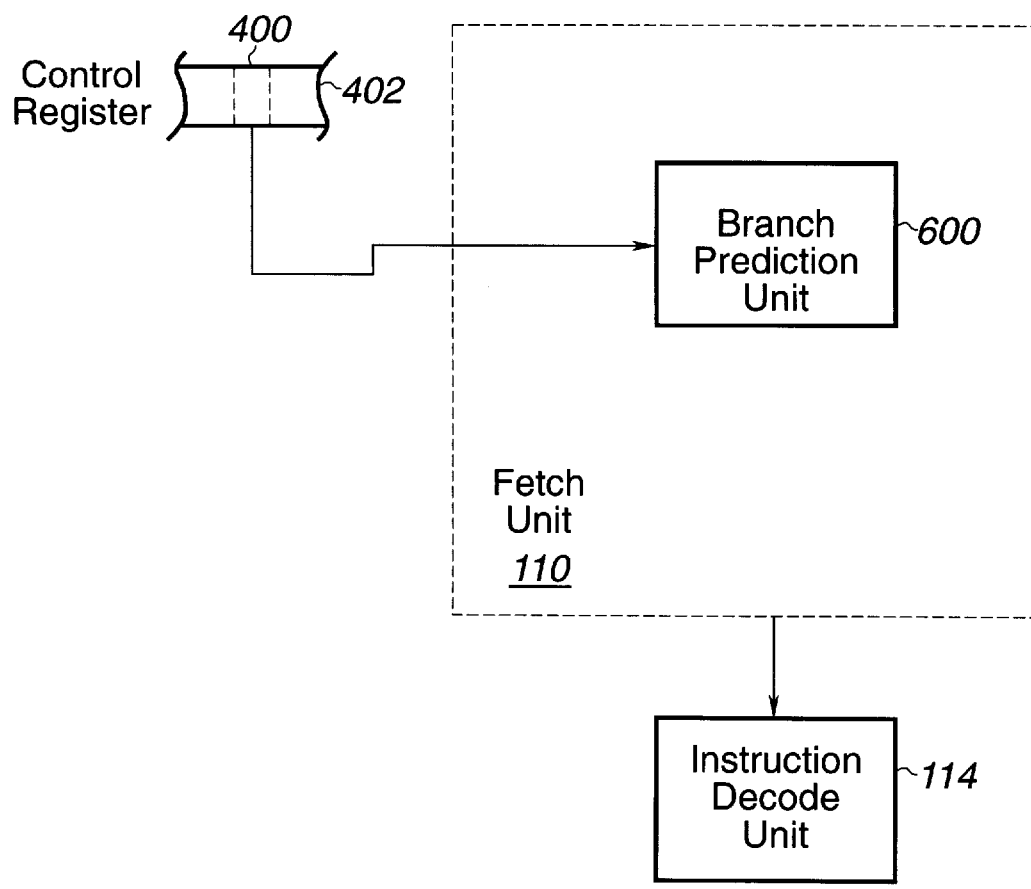
FIG. 7 is a block diagram of a portion of a microprocessor including a branch prediction unit configured to detect and use segment register selection information.

In one embodiment, the alternative branch prediction scheme is as follows: If the branch instruction includes the FS segment register override prefix byte, the branch is predicted taken. If the GS segment register override prefix byte is included, the branch is predicted not taken. It is noted that branch prediction unit 600 may execute the branch instructions as well as predict the branches taken or not taken. If microprocessor 101 is configured in this fashion, branch prediction unit 600 does not receive segment identification information from execution unit 112. Instead, branch prediction unit 600 detects the segment register override prefix byte. Such an embodiment is shown in FIG. 7. As shown in FIG. 7, branch prediction unit 600 receives enabling bit 400 from control register 402. As instructions are fetched by fetch unit 110, branch prediction unit 600 detects branch instructions and forms branch predictions. The prediction may be based upon segment register override prefix bytes included within the branch instruction as described above. It is additionally noted that branch prediction unit 600 may be configured to detect the segment identification information associated with a branch instruction even if branch prediction unit 600 does not execute the branch instructions. In such an embodiment, branch prediction unit 600 allows execution unit 112 to determine if the branch prediction is correct by executing the branch instruction. However, branch prediction unit 600 detects the use of a segment register override prefix byte when the instruction is fetched and forms the branch prediction in accordance with any detected prefix bytes.

The abovementioned uses for the segment register identification information are transparent uses, except for the embodiments which use the value stored in the selected segment register (instead of the existence of a particular segment override prefix byte) to control a feature. Non-transparent uses are also contemplated, as described below.

Two exemplary non-transparent uses may be implemented within execution unit 112. First, a segment register override prefix byte may be used to create instructions which do not modify the condition flags. As will be appreciated by those skilled in the art, "condition flags" are indicative of information regarding the result of executing an instruction. In the x86 microprocessor architecture, the condition flags include a carry flag indicative of a carry out of an arithmetic operation and a zero flag indicative of a zero result from an operation, among others. An exemplary instruction which may be modified to not change the condition flags in accordance with a generated result is the ADD instruction. Typically, the ADD instruction modifies the condition flags. An ADD instruction which uses a memory operand could be modified to an ADD instruction which does not modify the condition flags by using the segment register override prefix byte. In one embodiment, the FS segment register override prefix byte indicates that the ADD instruction will not modify the condition flags. This functionality allows for the scheduling of branches which are dependent upon a condition flag generated by a particular operation.

As used herein, the term "scheduling" refers to ordering instructions in as efficient a fashion as possible while still achieving the desired results. For example, an instruction which depends upon another instruction may be scheduled such that other instructions are placed between the two instructions. In this manner, stalls generated while the dependent instruction receives the data from the instruction upon which it depends may be eliminated. When the dependent instruction reaches execution, the value may be stored in a register or a memory location. For example, numerous instructions may be executed between the branch instruction and the instruction it depends upon for condition flags if those numerous instructions do not modify the condition flags. Therefore, the condition flags are set to the appropriate values many cycles prior to the branch instruction being executed. Instead of predicting the branch, branch prediction unit 600 may deterministically choose the direction the branch instruction will take.

Another embodiment which aids the scheduling of branch instructions is to implement multiple sets of condition flags. In this manner, multiple sets of conditions may be maintained simultaneously. Segment register override prefix bytes may be used with instructions which modify the condition flags to indicate which of multiple sets of condition flags to modify. A segment register override prefix byte may then be included with a branch instruction to indicate which of multiple sets of condition flags should be used to determine the branch direction (e.g. taken or not taken). If no segment register override prefix byte is included with respect to an instruction, then a default set of condition flags are associated with the instruction. It is noted that the condition flags may be stored in execution unit 112, branch prediction unit 600, or within both units simultaneously.

Another non-transparent use of segment register override prefix bytes may be embodied within instruction decode unit 114. As mentioned above, instruction decode unit 114 reads the register(s) specified as operands of an instruction and passes the values to execution unit 112 along with the instruction. In this embodiment, segment register override prefix bytes are used to select one of multiple register banks which store data. Each register bank may include the full complement of x86 registers. In this manner, the register set of the architecture may be expanded without changing the instruction encodings. As will be appreciated by those skilled in the art, a larger register set allows more operand values to be held in registers (which may be accessed quickly) and so accesses to memory (which typically require a longer period of time) are lessened. In one embodiment, no segment register override prefix byte specifies the first bank of registers, a segment register override prefix byte indicating the FS segment register specifies a second bank of registers, a segment register override prefix byte indicating the GS segment register specifies a third bank of registers, and a segment register override prefix byte indicating the ES segment register specifies a fourth bank of registers. In another embodiment, the value stored within the selected segment register is used to select the appropriate register bank from numerous register banks. It is noted that each register bank may be configured with a portion of the x86 registers as opposed to the entire register set.

It is noted that many other non-transparent uses may be created for segment register override prefix bytes. The present invention contemplates transparent and non-transparent functions implemented through the use of segment register override prefix bytes. It is additionally noted that while the above embodiments are 80×86 microprocessors, any microprocessor implemented in any microprocessor architecture may benefit from a similar expansion of the architecture.

Aspects regarding other portions of a microprocessor may be found in the co-pending, commonly assigned patent application entitled "High Performance Superscalar Microprocessor", Ser. No. 08/146,382, filed Oct. 29, 1993 by Witt, et al. Additionally, information may be found in the co-pending, commonly assigned patent application entitled "High Performance Superscalar Instruction Alignment Unit", Ser. No. 08/377,865, filed Jan. 25, 1995 by Tran, et al. The disclosures of both of the aforementioned applications are hereby incorporated by reference in their entirety.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an address translation unit configured to generate a physical address from a logical address and a segment value;
   a plurality of segment registers coupled to said address translation unit wherein at least one of said plurality of segment registers stores said segment value;
   a first control unit coupled to said address translation unit wherein said first control unit is configured to detect an instruction field indicative of one of said plurality of segment registers and to convey a signal to said address translation unit indicative of said one of said plurality of segment registers;
   a configuration register for storing a value indicative of an address translation mode of said microprocessor; and
   a branch prediction unit for handling branch instructions wherein said branch prediction unit is configured to modify the handling of a branch instruction according to said instruction field.

2. The microprocessor as recited in claim 1 further comprising multiple sets of condition flags indicative of the results of executing instructions.

3. The microprocessor as recited in claim 2 further comprising an execution unit wherein said execution unit is configured to select one of said multiple sets of condition flags to modify according to the results of executing an instruction including said instruction field, and wherein said execution unit is configured to select said one of said multiple sets of condition flags according to said instruction field.

4. The microprocessor as recited in claim 2 wherein said branch prediction unit is configured to select one of said multiple sets of condition flags for use by said branch instruction.

5. The microprocessor as recited in claim 4 wherein said one of said multiple sets of condition flags is used by said branch instruction to determine the direction of the branch instruction.

6. The microprocessor as recited in claim 1 wherein said branch prediction unit is configured to choose a default one of said multiple sets of condition flags if said instruction field is not detected.

7. The microprocessor as recited in claim 1 wherein said branch prediction unit is configured to handle said branch instruction according to a branch prediction scheme.

8. The microprocessor as recited in claim 7 wherein said branch prediction unit is configured to predict said branch instruction taken if said branch instruction includes a particular value within said instruction field.

9. The microprocessor as recited in claim 7 wherein said branch prediction unit is configured to predict said branch instruction not taken if said branch instruction includes another particular value within said instruction field.

10. The microprocessor of claim 1:

wherein the configuration register stores a first value when the microprocessor is in a flat memory address translation mode, and a second value when the microprocessor is in a different address translation mode, and;

wherein the branch prediction unit modifies handling of a branch instruction in response to said first value stored in the configuration register.

11. A computer system comprising:

a main memory; and a microprocessor coupled to said main memory wherein said microprocessor comprises:

an address translation unit configured to generate a physical address from a logical address and a segment value;

a plurality of segment registers coupled to said address translation unit wherein at least one of said plurality of segment registers stores said segment value;

a first control unit coupled to said address translation unit wherein said first control unit is configured to detect an instruction field indicative of one of said plurality of segment registers and to convey a signal to said address translation unit indicative of said one of said plurality of segment registers;

a configuration register for storing a value indicative of an address translation mode of said microprocessor; and a branch prediction unit for handling branch instructions wherein said branch prediction unit is configured to modify the handling of a branch instruction according to said instruction field.

12. The computer system as recited in claim 11 further comprising an external cache coupled between said microprocessor and said main memory.

* * * * *